(12) United States Patent
Kang et al.

(10) Patent No.: US 9,805,670 B2
(45) Date of Patent: Oct. 31, 2017

(54) DRIVING METHOD AND DRIVING DEVICE OF LIQUID CRYSTAL PANEL

(71) Applicant: Shenzhen China Star Optoelectronics Technology Co., Ltd., Guangdong (CN)

(72) Inventors: Chih-tsung Kang, Guangdong (CN); Lixuan Chen, Guangdong (CN)

(73) Assignee: SHENZHEN CHINA STAR OPTOELECTRON ICS TECHNOLOGY CO., LTD., Shenzhen, Guangdong (CN)

( * ) Notice: Subject to any disclaimer, the term of this patent is extended or adjusted under 35 U.S.C. 154(b) by 178 days.

(21) Appl. No.: 14/781,136

(22) PCT Filed: Aug. 12, 2015

(86) PCT No.: PCT/CN2015/086792
§ 371 (c)(1),
(2) Date: Sep. 29, 2015

(87) PCT Pub. No.: WO2017/008365
PCT Pub. Date: Jan. 19, 2017

(65) Prior Publication Data
US 2017/0018238 A1      Jan. 19, 2017

(30) Foreign Application Priority Data

Jul. 15, 2015   (CN) .......................... 2015 1 0417239

(51) Int. Cl.
*G09G 3/36*     (2006.01)
*G09G 3/20*     (2006.01)
(Continued)

(52) U.S. Cl.
CPC ......... *G09G 3/3607* (2013.01); *G09G 3/2003* (2013.01); *G09G 3/2074* (2013.01);
(Continued)

(58) Field of Classification Search
CPC .. G09G 3/2003; G09G 3/2074; G09G 3/3607; G09G 2300/0443;
(Continued)

(56) References Cited

U.S. PATENT DOCUMENTS 5,606,437 A *   2/1997   Mosier ............. G02F 1/136286
                                              349/106
6,633,306 B1 *  10/2003  Marz ..................... G02F 1/1323
                                              345/3.3
(Continued)

FOREIGN PATENT DOCUMENTS

CN    101855665    10/2010
CN    104299592    1/2015
(Continued)

OTHER PUBLICATIONS

Interational Search Report for PCT/CN2015/086792, Completed by the Chinese Patent Office on Mar. 11, 2016, 14 Pages.

*Primary Examiner* — Michael J Eurice

(57) ABSTRACT

A driving method and a driving device of a liquid crystal panel are provided. Pixels in a liquid crystal panel are divided into groups, wherein each group includes two pixels; determining an original greyscale value of a first color sub-pixel and an original greyscale value of a second color sub-pixel of each pixel; acquiring two actual greyscale values for driving the first color sub-pixel and two actual greyscale values for driving the second color sub-pixel in each group. The actual greyscale value for driving the first color sub-pixel is determined for each pixel, among the two actual greyscale values for driving the first color sub-pixel in each group, and determining the actual greyscale value for driving the second color sub-pixel of each pixel, among the two actual greyscale values for driving the second color sub-pixel in each group, according to a position of each pixel in each group.

12 Claims, 4 Drawing Sheets

(51) Int. Cl.
*G01J 3/46* (2006.01)
*G02F 1/1343* (2006.01)

(52) U.S. Cl.
CPC ... *G01J 3/463* (2013.01); *G02F 2001/134345* (2013.01); *G09G 2300/0443* (2013.01); *G09G 2300/0452* (2013.01); *G09G 2310/027* (2013.01); *G09G 2320/028* (2013.01); *G09G 2320/0242* (2013.01); *G09G 2320/0271* (2013.01); *G09G 2320/0276* (2013.01); *G09G 2360/16* (2013.01)

(58) Field of Classification Search
CPC ..... G09G 2300/0452; G09G 2310/027; G09G 2320/0242; G09G 2320/027; G09G 2320/028; G09G 2320/0271; G02F 2001/134345; G01J 3/463
See application file for complete search history.

(56) References Cited

U.S. PATENT DOCUMENTS

| | | | | |
|---|---|---|---|---|
| 6,714,206 B1* | 3/2004 | Martin | G09G 3/2003 | 345/589 |
| 2006/0055648 A1 | 3/2006 | Kamada et al. | | |
| 2006/0097971 A1* | 5/2006 | Lee | G09G 3/3648 | 345/89 |
| 2006/0279522 A1* | 12/2006 | Kurihara | G09G 3/3413 | 345/102 |
| 2007/0152926 A1* | 7/2007 | Kwon | G09G 3/3426 | 345/82 |
| 2007/0211008 A1* | 9/2007 | Lee | G09G 3/3614 | 345/98 |
| 2008/0030660 A1* | 2/2008 | Roth | G09G 3/3607 | 349/106 |
| 2008/0036718 A1* | 2/2008 | Lee | G09G 3/3607 | 345/88 |
| 2008/0158203 A1* | 7/2008 | Irie | G02F 1/13306 | 345/204 |
| 2008/0309600 A1* | 12/2008 | Lee | G09G 3/3648 | 345/89 |
| 2009/0009455 A1* | 1/2009 | Kimura | G09G 3/2074 | 345/89 |
| 2009/0027363 A1* | 1/2009 | Kwan | G09G 3/20 | 345/204 |
| 2009/0027364 A1* | 1/2009 | Kwan | G09G 3/20 | 345/204 |
| 2009/0153454 A1* | 6/2009 | Irie | G09G 3/3648 | 345/89 |
| 2010/0091033 A1* | 4/2010 | Itoyama | G09G 3/2092 | 345/600 |
| 2010/0123867 A1* | 5/2010 | Jung | G02F 1/133753 | 349/141 |
| 2010/0238203 A1* | 9/2010 | Stroemer | G09G 3/3611 | 345/690 |
| 2012/0112991 A1* | 5/2012 | Hashimoto | G09G 3/3413 | 345/89 |
| 2013/0050304 A1* | 2/2013 | Yoshinaga | G09G 3/36 | 345/694 |
| 2014/0043369 A1* | 2/2014 | Albrecht | G09G 3/2074 | 345/690 |
| 2016/0217753 A1* | 7/2016 | Cao | G09G 3/3607 | |
| 2016/0343284 A1 | 11/2016 | Sun | | |

FOREIGN PATENT DOCUMENTS

| | | |
|---|---|---|
| CN | 104317084 | 1/2015 |
| CN | 104465714 | 3/2015 |
| CN | 104900203 | 9/2015 |

* cited by examiner

US 9,805,670 B2

DRIVING METHOD AND DRIVING DEVICE OF LIQUID CRYSTAL PANEL

CROSS-REFERENCE TO RELATED APPLICATION

This application is the U.S. national phase of PCT Application No. PCT/CN2015/086792 filed on Aug. 12, 2015, which claims priority to CN Patent Application No. 201510417239.3 filed on Jul. 15, 2015, the disclosures of which are incorporated in their entirety by reference herein.

TECHNICAL FIELD

The present disclosure relates to a technical field of a liquid crystal display, and more particularly, to a driving method and a driving device of a liquid crystal panel.

BACKGROUND ART

In recent years, a traditional Cathode Ray Tube (CRT) display is gradually replaced by a Liquid Crystal Display (LCD) as the LCD is advantageous in its small size, light weight, high display quality, and the like. A picture displayed by a liquid crystal panel in the liquid crystal display is constituted by a plurality of pixels arranged in arrays, each pixel is usually composed of sub-pixels displaying a respective color respectively, and a brightness displayed by each sub-pixel is determined together by the brightness of a backlight module of the liquid crystal display and a greyscale of the sub-pixel of the liquid crystal panel. In an existing driving method of the liquid crystal display, a most common method is: maintaining a fixed brightness by using the brightness of the backlight module; driving a liquid crystal in each sub-pixel of the liquid crystal panel to rotate by using a greyscale voltage of a different size respectively according to input image data, so as to determine light transmittance (i.e. the brightness) of the respective sub-pixel through a rotation angle of a liquid crystal molecule, thus achieving a purpose of greyscale display and imaging.

With development of a liquid crystal display technique, a 2D1G technique is proposed in order to solve a color bias problem of the liquid crystal display. The so-called 2D1G technique divides the sub-pixel in the liquid crystal panel into a primary sub-pixel area and a secondary sub-pixel area. A data signal (i.e. a greyscale voltage) is applied to the primary sub-pixel area and the secondary sub-pixel area of the sub-pixel so as to make the sub-pixel to display a corresponding greyscale, thereby performing imaging. However, after dividing each sub-pixel into the primary sub-pixel area and the secondary sub-pixel area, the number of data lines for applying the data signal will be doubled, which significantly reduces an aperture ratio of the liquid crystal panel, thereby affecting a transmission rate.

SUMMARY

In order to overcome a defect of the related art, an exemplary embodiment of the present disclosure provides a driving method of a liquid crystal panel, which simulates 2D1G and can improve color bias of the liquid crystal panel without affecting an aperture ratio and a transmission rate of the liquid crystal panel.

According to one aspect of an exemplary embodiment of the present disclosure, there is provided a driving method of a liquid crystal panel, which may include:

(A) dividing pixels in a liquid crystal panel into groups, wherein each group includes two pixels, and two pixels in any group are the two adjacent pixels in a predetermined direction;

(B) determining an original greyscale value of a first color sub-pixel and an original greyscale value of a second color sub-pixel of each pixel in each group;

(C) acquiring two actual greyscale values for driving the first color sub-pixel in each group according to at least one of the original greyscale values of the first color sub-pixel of two pixels in each group; acquiring two actual greyscale values for driving the second color sub-pixel in each group according to at least one of the original greyscale values of the second color sub-pixel of two pixels in each group; and (D) determining the actual greyscale value for driving the first color sub-pixel of each pixel, among the two actual greyscale values for driving the first color sub-pixel in each group, and determining the actual greyscale value for driving the second color sub-pixel of each pixel, among the two actual greyscale values for driving the second color sub-pixel in each group, according to a position of each pixel in each group.

Wherein step (D) may include:

determining a larger one of the two actual greyscale values for driving the first color sub-pixel in each group as the actual greyscale value for driving the first color sub-pixel of one pixel of the two pixels, of which a sum of a row number and a column number is an even number, in each group;

determining a smaller one of the two actual greyscale values for driving the first color sub-pixel in each group as the actual greyscale value for driving the first color sub-pixel of one pixel of the two pixels, of which a sum of a row number and a column number is an odd number, in each group;

determining a larger one of the two actual greyscale values for driving the second color sub-pixel in each group as the actual greyscale value for driving the second color sub-pixel of one pixel of the two pixels, of which a sum of a row number and a column number is an odd number, in each group; and determining a smaller one of the two actual greyscale values for driving the second color sub-pixel in each group as the actual greyscale value for driving the second color sub-pixel of one pixel of the two pixels, of which a sum of a row number and a column number is an even number, in each group.

Wherein the predetermined direction is a lateral direction or a longitudinal direction.

Wherein the step of acquiring, according to at least one of the original greyscale values of any color sub-pixel of two pixels in any group, the two actual greyscale values for driving the color sub-pixel in the group may include:

determining an index value according to at least one of the original greyscale values of the color sub-pixel of the two pixels in the group; and looking up two actual greyscale values corresponding to the index value from a display look-up table of the color sub-pixel, to acquire the two actual greyscale values for driving the color sub-pixel in the group.

Wherein the step of determining the index value may include:

taking the original greyscale value of the color sub-pixel of any one of the two pixels in the group as the index value.

Wherein the step of determining the index value may include:

taking an average value of the original greyscale values of the color sub-pixel of the two pixels in the group as the index value.

Wherein the display look-up table of the color sub-pixel is acquired through the following steps:

acquiring an actual brightness value of the color sub-pixel under a respective greyscale value within a greyscale value range of the liquid crystal panel separately in a case of front viewing and in a case of obliquely viewing;

calculating a theoretical brightness value of the color sub-pixel under the respective greyscale value within the greyscale value range separately in the case of front viewing and in the case of obliquely viewing;

determining two actual greyscale values meeting a predetermined condition and corresponding to each greyscale value within the greyscale value range which is taken as the index value, according to the acquired respective actual brightness value and the calculated respective theoretical brightness value; and acquiring the display look-up table based on a correspondence relationship between each index value and the actual greyscale value.

Wherein the actual brightness value of the color sub-pixel under the respective greyscale value within the greyscale value range of the liquid crystal panel in the case of front viewing and in the case of obliquely viewing is acquired by measuring a gamma curve of the color sub-pixel separately in the case of front viewing and in the case of obliquely viewing.

Wherein the theoretical brightness value of the color sub-pixel under any greyscale value g within the greyscale value range in a case of viewing from any angle is calculated through the following equation:

$$Lv(g)=Lv(g_{max})'\times(g/g_{max})^\gamma$$

wherein γ is a predetermined gamma value, Lv(g) is the theoretical brightness value of the color sub-pixel under the greyscale value g in the case of viewing from the angle, and Lv(g)' is the actual brightness values of the color sub-pixel under the maximum greyscale value $g_{max}$ within the greyscale value range in the case of viewing from the angle, wherein viewing from the angle refers to front viewing or obliquely viewing.

Wherein any greyscale value g within the greyscale value range, which is taken as the index value, as well as two corresponding actual greyscale values $g_H$ and $g_L$ meet the following predetermine condition:

$$\min\ y=[Lv_{front}(g)+Lv_{front}(g)-Lv_{front}(g_H)'-Lv_{front}(g_L)']^2+[Lv_{oblique}(g)+Lv_{oblique}(g)-Lv_{oblique}(g_H)'-Lv_{oblique}(g_L)']^2$$

wherein $Lv_{front}(g)$ and $Lv_{oblique}(g)$ are the theoretical brightness value of the color sub-pixel under the greyscale value g separately in the case of front viewing and in the case of obliquely viewing, $Lv_{front}(g_H)'$ and $Lv_{oblique}(g_H)'$ are the actual brightness value of the color sub-pixel under the actual greyscale value $g_H$ separately in the case of front viewing and in the case of obliquely viewing, $Lv_{front}(g_L)'$ and $Lv_{oblique}(g_L)'$ are the actual brightness value of the color sub-pixel under the actual greyscale value is $g_L$ separately in the case of front viewing and in the case of obliquely viewing.

Wherein the first color sub-pixel is a blue sub-pixel, the second color sub-pixel is a green sub-pixel or a red sub-pixel, or the first color sub-pixel is a green sub-pixel or a red sub-pixel, the second color sub-pixel is a blue sub-pixel.

According to another aspect of an exemplary embodiment of the present disclosure, there is provided a driving device of a liquid crystal panel, which may include:

a grouping unit configured to divide pixels in a liquid crystal panel into groups, wherein each group includes two pixels, and two pixels in any group are the two adjacent pixels in a predetermined direction;

an original greyscale value determination unit configured to determine an original greyscale value of a first color sub-pixel and an original greyscale value of a second color sub-pixel of each pixel in each group;

an actual greyscale value acquisition unit configured to acquire two actual greyscale values for driving the first color sub-pixel in each group according to at least one of the original greyscale values of the first color sub-pixel of two pixels in each group; and to acquire two actual greyscale values for driving the second color sub-pixel in each group according to at least one of the original greyscale values of the second color sub-pixel of two pixels in each group; and a driving determination unit configured to determine the actual greyscale value for driving the first color sub-pixel of each pixel, among the two actual greyscale values for driving the first color sub-pixel in each group, and to determine the actual greyscale value for driving the second color sub-pixel of each pixel, among the two actual greyscale values for driving the second color sub-pixel in each group, according to a position of each pixel in each group.

Wherein the driving determination unit is configured to determine a larger one of the two actual greyscale values for driving the first color sub-pixel in each group as the actual greyscale value for driving the first color sub-pixel of one pixel of the two pixels, of which a sum of a row number and a column number is an even number, in each group; and to determine a smaller one of the two actual greyscale values for driving the first color sub-pixel in each group as the actual greyscale value for driving the first color sub-pixel of one pixel of the two pixels, of which a sum of a row number and a column number is an odd number, in each group; and to determine a larger one of the two actual greyscale values for driving the second color sub-pixel in each group as the actual greyscale value for driving the second color sub-pixel of one pixel of the two pixels, of which a sum of a row number and a column number is an odd number, in each group; and to determine a smaller one of the two actual greyscale values for driving the second color sub-pixel in each group as the actual greyscale value for driving the second color sub-pixel of one pixel of the two pixels, of which a sum of a row number and a column number is an even number, in each group.

Wherein the predetermined direction is a lateral direction or a longitudinal direction.

Wherein the actual greyscale value acquisition unit is configured to sequentially acquire the two actual greyscale values for driving the first color sub-pixel and the two actual greyscale values for driving the second color sub-pixel, wherein the actual greyscale value acquisition unit may include:

an index value determination unit configured to determining an index value according to at least one of the original greyscale values of any color sub-pixel of the two pixels in any group; and;

a table look-up unit configured to look up two actual greyscale values corresponding to the index value from a display look-up table of the color sub-pixel, to acquire the two actual greyscale values for driving the color sub-pixel in the group.

Wherein the index value determination unit is configured to take the original greyscale value of the color sub-pixel of any one of the two pixels in the group as the index value.

Wherein the index value determination unit is configured to take an average value of the original greyscale values of the color sub-pixel of the two pixels in the group as the index value.

Wherein the actual greyscale value acquisition unit may further include: a table creation unit configured to create a display look-up table of the color sub-pixel, wherein the table creation unit may include:

an actual brightness value acquisition unit configured to acquire an actual brightness value of the color sub-pixel under a respective greyscale value within a greyscale value range of the liquid crystal panel separately in a case of front viewing and in a case of obliquely viewing;

a theoretical brightness value calculation unit configured to calculate a theoretical brightness value of the color sub-pixel under the respective greyscale value within the greyscale value range separately in the case of front viewing and in the case of obliquely viewing;

a relationship determination unit configured to determine two actual greyscale values meeting a predetermined condition and corresponding to each greyscale value within the greyscale value range which is taken as the index value, according to the acquired respective actual brightness value and the calculated respective theoretical brightness value; and a creation unit configured to acquire the display look-up table based on a correspondence relationship between each index value and the actual greyscale value.

Wherein the actual brightness value acquisition unit is configured to acquire the actual brightness value of the color sub-pixel under the respective greyscale value within the greyscale value range of the liquid crystal panel in the case of front viewing and in the case of obliquely viewing by measuring a gamma curve of the color sub-pixel separately in the case of front viewing and in the case of obliquely viewing.

Wherein the theoretical brightness value calculation unit is configured to calculate the theoretical brightness value of the color sub-pixel under any greyscale value g within the greyscale value range in a case of viewing from any angle through the following equation:

$$Lv(g) = Lv(g_{max})' \times (g/g_{max})^\gamma$$

wherein $\gamma$ is a predetermined gamma value, $Lv(g)$ is the theoretical brightness value of the color sub-pixel under the greyscale value g in the case of viewing from the angle, and $Lv(g)'$ is the actual brightness values of the color sub-pixel under the maximum greyscale value $g_{max}$ within the greyscale value range in the case of viewing from the angle, wherein viewing from the angle refers to front viewing or obliquely viewing.

Wherein any greyscale value g within the greyscale value range, which is determined by the relationship determination unit and is taken as the index value, as well as two corresponding actual greyscale values $g_H$ and $g_L$ meet the following predetermine condition:

$$\min \ y = [Lv_{front}(g) + Lv_{front}(g) - Lv_{front}(g_H)' - Lv_{front}(g_L)']^2 + [Lv_{oblique}(g) + Lv_{oblique}(g) - Lv_{oblique}(g_H)' - Lv_{oblique}(g_L)']^2$$

wherein $Lv_{front}(g)$ and $Lv_{oblique}(g)$ are the theoretical brightness value of the color sub-pixel under the greyscale value g separately in the case of front viewing and in the case of obliquely viewing, $Lv_{front}(g_H)'$ and $Lv_{oblique}(g_H)'$ are the actual brightness value of the color sub-pixel under the actual greyscale value $g_H$ separately in the case of front viewing and in the case of obliquely viewing, $Lv_{front}(g_L)'$ and $Lv_{oblique}(g_L)'$ are the actual brightness value of the color sub-pixel under the actual greyscale value is $g_L$ separately in the case of front viewing and in the case of obliquely viewing.

Wherein the first color sub-pixel is a blue sub-pixel, the second color sub-pixel is a green sub-pixel or a red sub-pixel, or the first color sub-pixel is a green sub-pixel or a red sub-pixel, the second color sub-pixel is a blue sub-pixel.

The driving method and the driving device of the liquid crystal panel provided according to the exemplary embodiment of the present disclosure, can improve color bias of the liquid crystal panel without affecting an aperture ratio and a transmission rate of the liquid crystal panel.

Other aspects and/or advantages of the present disclosure will be partially illustrated in the following description, and another part will be apparent through description or may be known through implementation of the present disclosure.

BRIEF DESCRIPTION OF THE DRAWINGS

The above and/or other purposes and advantages of the disclosure will become more apparent from the following description of embodiments, taken in conjunction with accompanying drawings in which.

DETAILED DESCRIPTION OF EXEMPLARY EMBODIMENTS

Figure 1:
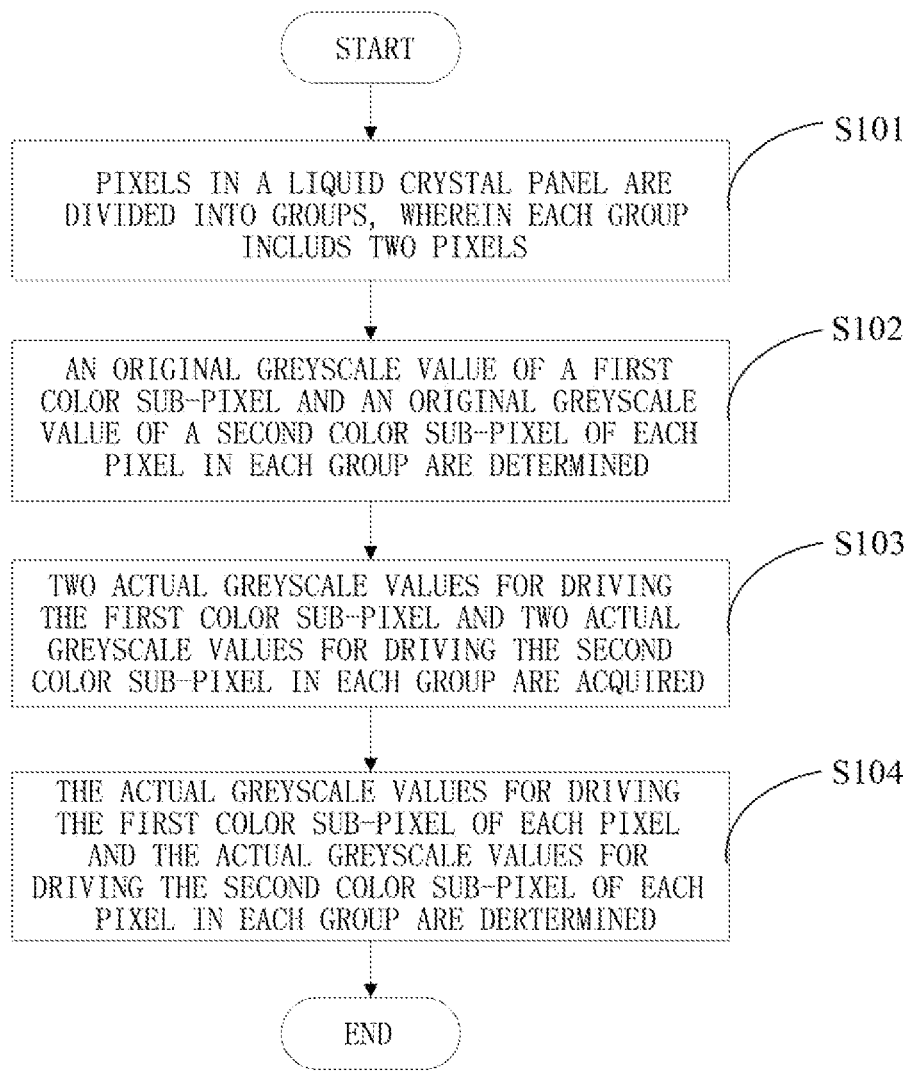
FIG. 1 is a flowchart illustrating a driving method of a liquid crystal panel according to an exemplary embodiment of the present disclosure.

Detailed description will now be made to an exemplary embodiment of the present disclosure, an example of exemplary embodiment is shown in the drawings, in which the same reference numbers are used to refer to the same parts. The embodiment will be illustrated in detail below with reference to accompany drawings, so as to explain the disclosure.

FIG. 1 is a flowchart illustrating a driving method of a liquid crystal panel according to an exemplary embodiment of the present disclosure.

As shown in FIG. 1, in Step S101, pixels in the liquid crystal panel are divided into groups, wherein each group includes two pixels. Here, two pixels in any group are two adjacent pixels in a predetermined direction. The predetermined direction can be a lateral direction or a longitudinal direction.

Here, each pixel of the liquid crystal panel includes a plurality of sub-pixels of different colors. For example, the pixel may include a red (R) sub-pixel, a green (G) sub-pixel, and a blue (B) sub-pixel. In addition, the pixel may also include a yellow (Y) sub-pixel and a white (W) sub-pixel. It can be understood that the present disclosure is not limited thereto, and it may also disclose the liquid crystal panel in which each pixel includes the sub-pixel of other colors.

Specifically, each row of pixels of the liquid crystal panel can be non-repeatedly divided into groups, each group including two adjacent pixels. For example, when there are only four pixels in each row of the liquid crystal panel, two adjacent pixels having column numbers 1 and 2 in each row can be divided into one group, and two adjacent pixels having column numbers 3 and 4 in each row can be divided into one group.

In addition, each column of pixels of the liquid crystal panel can also be non-repeatedly divided into groups, each group including two adjacent pixels. For example, when there are only four pixels in each column of the liquid crystal panel, two adjacent pixels having row numbers 1 and 2 in each column can be divided into one group, and two adjacent pixels having row numbers 3 and 4 in each column can be divided into one group.

In step S102, an original greyscale value of a first color sub-pixel and an original greyscale value of a second color sub-pixel of each pixel in each group are determined. That is, the original greyscale value of the first color sub-pixel and the original greyscale value of the second color sub-pixel are separately determined, with respect to each pixel in each group.

Here, the first color sub-pixel and the second color sub-pixel are two sub-pixels of different colors. The colors of the first color sub-pixel and the second color sub-pixel can be determined correspondingly according to a type of the liquid crystal panel. For example, when each pixel of the liquid crystal panel includes the R sub-pixel, the G sub-pixel and the B sub-pixel, the first color sub-pixel may be any one of the R, G, B sub-pixels, and the second color sub-pixel may be any one of the R, G, B color sub-pixels of which the color is different from that of the first color sub-pixel. Preferably, the first color sub-pixel is the blue sub-pixel, the second color sub-pixel is the green sub-pixel or the red sub-pixel, or, the first color sub-pixel is the green sub-pixel or the red sub-pixel, and the second color sub-pixel is the blue sub-pixel.

In addition, the original greyscale value is an initial greyscale value of a image displayed by the sub-pixel (for example, the greyscale value configured for the sub-pixel when driving the liquid crystal panel to display the image in the related art). It can be understood that, various existing methods can be used to determine the original greyscale value of the first color sub-pixel and the original greyscale value of the second color sub-pixel of each pixel in each group.

In step S103, two actual greyscale values for driving the first color sub-pixel in each group are acquired according to at least one of the original greyscale values of the first color sub-pixel of two pixels in each group determined in step S102; two actual greyscale values for driving the second color sub-pixel in each group are acquired according to at least one of the original greyscale values of the second color sub-pixel of two pixels in each group determined in step S102.

In other words, with respect to the first color sub-pixel of two pixels in each group (that is, with respect to two first color sub-pixels in each group), two actual greyscale values for driving the color sub-pixels are acquired by using at least one of two original greyscale values of the color sub-pixels; and with respect to the second color sub-pixel of two pixels in each group (that is, with respect to two second color sub-pixels in each group), two actual greyscale values for driving the color sub-pixels are acquired by using at least one of two original greyscale values of the color sub-pixels.

Here, the actual greyscale value is the actual greyscale of the image displayed by the sub-pixel. It can be understood that, various existing methods can be used to acquire two actual greyscale values for driving the first color sub-pixel and two actual greyscale values for driving the second color sub-pixel in each group.

Figure 2:
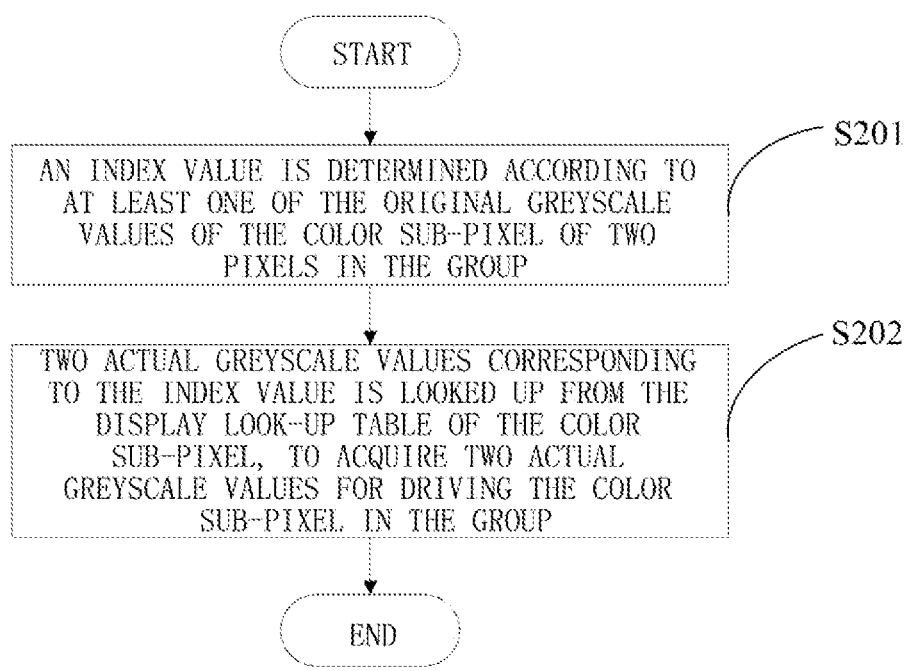
FIG. 2 is a flowchart illustrating a step of acquiring, according to at least one of original greyscale values of any color sub-pixel of two pixels of any group, two actual greyscale values for driving the color sub-pixel of the group, according to an exemplary embodiment of the present disclosure.

As an example, a step of acquiring, according to at least one of the original greyscale values of any color sub-pixel of two pixels in any group, two actual greyscale values for driving the color sub-pixel of the group is shown in FIG. 2.

FIG. 2 is a flowchart illustrating a step of acquiring, according to at least one of original greyscale values of any color sub-pixel of two pixels of any group, two actual greyscale values for driving the color sub-pixel of the group, according to an exemplary embodiment of the present disclosure.

As shown in FIG. 2, in step S201, an index value is determined according to at least one of the original greyscale values of the color sub-pixel of two pixels in the group. Here, the index value is a greyscale value for looking up a display look-up table as mentioned below. It can be understood that, various existing methods can be used to determine the index value.

As an example, the original greyscale value of the color sub-pixel of any one of two pixels in the group is taken as the index value.

As another example, an average value of the original greyscale values of the color sub-pixel of two pixels in the group is taken as the index value.

In step S202, two actual greyscale values corresponding to the index value determined in step S201 is looked up from the display look-up table of the color sub-pixel, to acquire two actual greyscale values for driving the color sub-pixel in the group. In the display look-up table, each index value corresponds to two actual greyscale values.

Here, the display look-up table can be determined through various existing methods. Preferably, the step of acquiring the display look-up table of the color sub-pixel is shown in FIG. 3.

Figure 3:
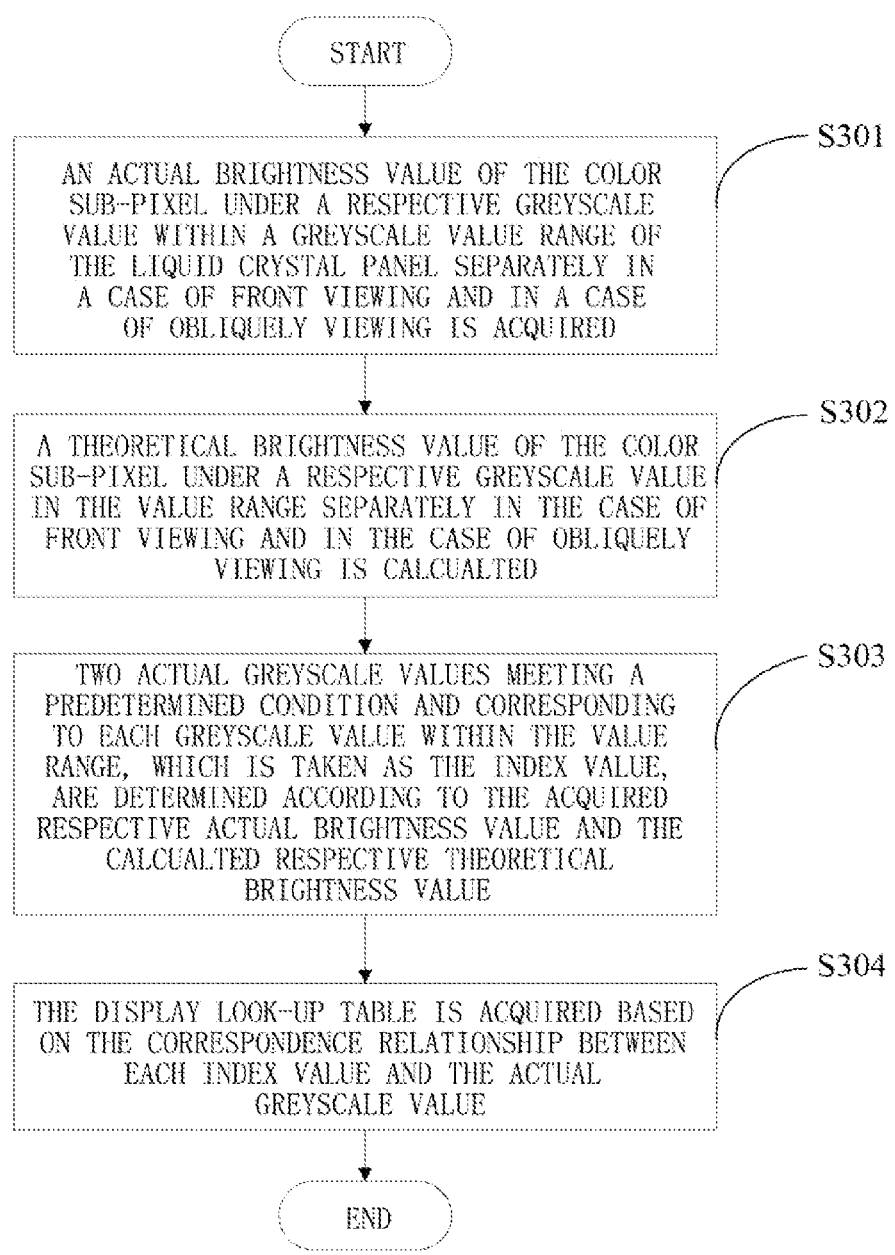
FIG. 3 is a flowchart illustrating a step of acquiring a display look-up table of any color sub-pixel according to an exemplary embodiment of the present disclosure.

FIG. 3 is a flowchart illustrating a step of acquiring a display look-up table of any color sub-pixel according to an exemplary embodiment of the present disclosure.

As shown in FIG. 3, in step S301, an actual brightness value of the color sub-pixel under a respective greyscale value within a greyscale value range of the liquid crystal panel separately in a case of front viewing and in a case of obliquely viewing is acquired. Here, front viewing refers to viewing the liquid crystal panel in parallel with a direction perpendicular to the liquid crystal panel. Obliquely viewing refers to viewing the liquid crystal panel from a place in a line so that the angle between the line and the direction perpendicular to the liquid crystal panel is about 60 degree. The value range of the greyscale value may vary along with the liquid crystal panel. When the liquid crystal panel is a 8-bit liquid crystal panel (that is, using a 8-bit binary number to indicate the greyscale value), the value range is [0, 255]; when the liquid crystal panel is a 10-bit liquid crystal panel (that is, using a 10-bit binary to indicate the greyscale value), the value range is [0, 1023]. It can be understood that, various existing methods can be used to determine the actual brightness value.

As an example, the actual brightness value of the color sub-pixel under the respective greyscale value within the greyscale value range of the liquid crystal panel in the case of front viewing and in the case of obliquely viewing may be acquired by measuring a gamma curve of the color sub-pixel separately in the case of front viewing and in the case of obliquely viewing. The gamma curve is a curve indicating a relationship between a greyscale and a brightness of the color sub-pixel. Here, the gamma curve can be measured through various existing methods.

In step S302, the theoretical brightness value of the color sub-pixel under a respective greyscale value in the value range separately in the case of front viewing and in the case of obliquely viewing is calculated. Here, the theoretical brightness value can be calculated through various existing calculation methods.

As an example, the theoretical brightness value of the color sub-pixel under any greyscale value g within the value range in a case of viewing from any angle is calculated through the following equation:

$$Lv(g)=Lv(g_{max})' \times (g/g_{max})^\gamma \quad (1)$$

Here, $\gamma$ is a predetermined gamma value, $Lv(g)$ is the theoretical brightness value of the color sub-pixel under the greyscale value g in the case of viewing from the angle, and $Lv(g_{max})'$ is the actual brightness values of the color sub-pixel under the maximum greyscale value $g_{max}$ within the value range in the case of viewing from the angle. Here, the angle refers to front viewing or obliquely viewing. It should be understood that, the above equation (1) can also be used to calculate the theoretical brightness value in a case of view from another angle other than front viewing and obliquely viewing.

When calculating the theoretical brightness value of the color sub-pixel under any greyscale value g within the value range in the case of front viewing, the greyscale value g, the maximum greyscale value $g_{max}$ within the value range and the predetermined gamma value $\gamma$ are substituted into equation (1), and actual brightness value $Lv(g_{max})'$ of the color sub-pixel under the maximum greyscale value $g_{max}$ in the case of front viewing is substituted, thus obtaining the theoretical brightness value of the color sub-pixel under the greyscale value g in the case of front viewing. Based on this, the theoretical brightness value of the color sub-pixel under the respective greyscale value within the value range in the case of front viewing can be calculated.

When calculating the theoretical brightness value of the color sub-pixel under any greyscale value g within the value range in the case of obliquely viewing, the greyscale value g, the maximum greyscale value $g_{max}$ within the value range and the predetermined gamma value $\gamma$ are substituted into equation (1), and actual brightness value max 25 $Lv(g_{max})'$ of the color sub-pixel under the maximum greyscale value $g_{max}$ in the case of obliquely viewing is substituted, thus obtaining the theoretical brightness value of the color sub-pixel under the greyscale value g in the case of obliquely viewing. Based on this, the theoretical brightness value of the color sub-pixel under the respective greyscale value within the value range in the case of obliquely viewing can be calculated.

Here, the predetermined gamma value $\gamma$ may be 2.2, but is not limited thereto, which can be set according to an actual situation. The maximum greyscale value $g_{max}$ may vary along with the liquid crystal panel. For example, when the liquid crystal panel is the 8-bit liquid crystal panel (that is, using the 8-bit binary number to indicate the greyscale value), the maximum greyscale value $g_{max}$ may be 255; when the liquid crystal panel is the 10-bit liquid crystal panel (that is, using the 10-bit binary to indicate the greyscale value), the maximum greyscale value $g_{max}$ may be 1023, but is not limited thereto, which can also be determined according to an actual parameter of the liquid crystal panel.

In step S303, two actual greyscale values meeting a predetermined condition and corresponding to each greyscale value within the value range, which is taken as the index value, are determined according to the respective actual brightness value acquired in step S301 and the respective theoretical brightness value calculated in step S302, that is, with respect to each greyscale value within the value range, which is taken as the index value, two actual greyscale values corresponding to the greyscale value may be determined, and the predetermine condition may be met between each greyscale value and two actual greyscale values. Those skilled in the art may set the predetermined condition according to actual experience.

Preferably, any greyscale value g within the greyscale value range, which is taken as the index value, as well as two corresponding actual greyscale values $g_H$ and $g_L$ meet the following predetermine condition:

$$\min \quad y=[Lv_{front}(g)+Lv_{front}(g)-Lv_{front}(g_H)'-Lv_{front}(g_L)']^2+[Lv_{oblique}(g)+Lv_{oblique}(g)-Lv_{oblique}(g_H)'-Lv_{oblique}(g_L)']^2 \quad (2)$$

Here, $Lv_{front}(g)$ and $Lv_{oblique}(g)$ are the theoretical brightness value of the color sub-pixel under the greyscale value g separately in the case of front viewing and in the case of obliquely viewing, $Lv_{front}(g_H)'$ and $Lv_{oblique}(g_H)'$ are the actual brightness value of the color sub-pixel under the actual greyscale value $g_H$ separately in the case of front viewing and in the case of obliquely viewing, $Lv_{front}(g_L)'$ and $Lv_{oblique}(g_L)'$ are the actual brightness value of the color sub-pixel under the actual greyscale value is $g_L$ separately in the case of front viewing and in the case of obliquely viewing.

Thus, two actual greyscale values corresponding to each index value within the value range and meeting the equation (2) may be determined.

In step S304, the display look-up table is acquired based on the correspondence relationship between each index value and the actual greyscale value within the value range determined in step S303.

Returning to FIG. 2, by using the display look-up table of the color sub-pixel acquired through the steps as shown in FIG. 3, two actual greyscale values corresponding to the index value determined in step S201 may be found from the display look-up table, so as to acquire two actual greyscale values for driving the color sub-pixel of the group.

In this way, according to the steps as shown in FIG. 2, two actual greyscale values for driving the first color sub-pixel and two actual greyscale values for driving the second color sub-pixel in each group may then be sequentially acquired.

Returning to FIG. 1, in step S104, according to the position of each pixel in each group, the actual greyscale value for driving the first color sub-pixel of each pixel among two actual greyscale values for driving the first color sub-pixel in each group acquired in step S103, is determined, and the actual greyscale value for driving the second color sub-pixel of each pixel among two actual greyscale values for driving the second color sub-pixel in each group acquired in step S103, is determined.

Specifically, with respect to any group, according to the position of each pixel in each group, two actual greyscale values for driving the first color sub-pixel in the group acquired in step S103 are taken separately as the actual greyscale value of the first color sub-pixel of two pixels in the group, to drive the first color sub-pixel of two pixels, and two actual greyscale values for driving the second color sub-pixel in the group acquired in step S103 are taken separately as the actual greyscale value of the second color sub-pixel of two pixels in the group, to drive the second color sub-pixel of two pixels.

In addition, in step S104, after determining the actual greyscale value for driving the first color sub-pixel of each pixel in each group, the actual greyscale value for driving the first color sub-pixel of each pixel in each group is used to drive the first color sub-pixel of each pixel of each group; and after determining the actual greyscale value for driving the second color sub-pixel of each pixel in each group, the actual greyscale value for driving the second color sub-pixel of each pixel in each group is used to drive the second color sub-pixel of each pixel of each group.

Here, any one of two actual greyscale values for driving the first color sub-pixel of the group may be taken as the actual greyscale value of the first color sub-pixel of any pixel of the group; any one of two actual greyscale values for driving the second color sub-pixel of the group may be taken as the actual greyscale value of the second color sub-pixel of any pixel of the group.

As a preferred embodiment, determining a larger one of two actual greyscale values for driving the first color sub-pixel in each group as the actual greyscale value for driving the first color sub-pixel of one pixel of two pixels, of which a sum of a row number and a column number is an even number, in each group; determining a smaller one of two actual greyscale values for driving the first color sub-pixel in each group as the actual greyscale value for driving the first color sub-pixel of one pixel of two pixels, of which a sum of a row number and a column number is an odd number, in each group; determining a larger one of two actual greyscale values for driving the second color sub-pixel in each group as the actual greyscale value for driving the second color sub-pixel of one pixel of two pixels, of which a sum of a row number and a column number is an odd number, in each group; and determining a smaller one of two actual greyscale values for driving the second color sub-pixel in each group as the actual greyscale value for driving the second color sub-pixel of one pixel of two pixels, of which a sum of a row number and a column number is an even number, in each group.

Figure 4:
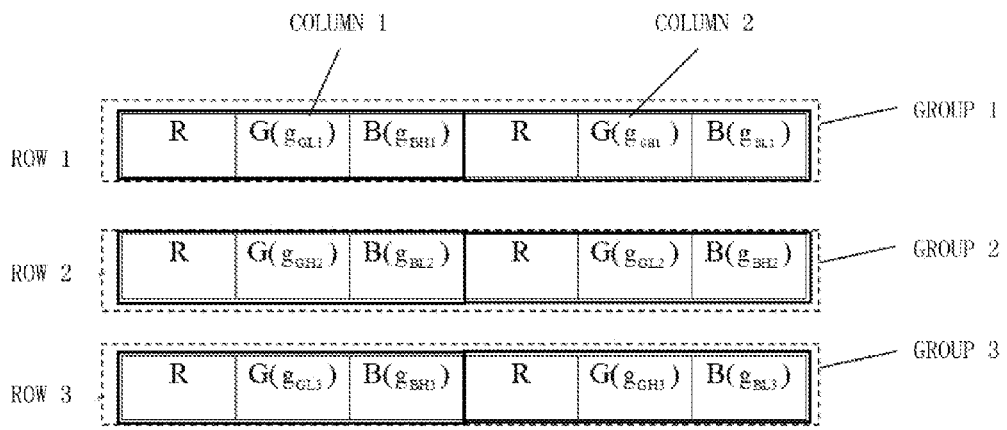
FIG. 4 is a schematic diagram illustrating actual greyscale values determined separately with respect to a first color sub-pixel and a second color sub-pixel of a part of pixels of a liquid crystal panel, according to an exemplary embodiment of the present disclosure.

FIG. 4 is a schematic diagram illustrating actual greyscale values determined separately with respect to a first color sub-pixel and a second color sub-pixel of a part of pixels of a liquid crystal panel, according to an exemplary embodiment of the present disclosure.

FIG. 4 shows a part of the pixels (3 rows×2 columns of pixels (each heavy lined box representing one pixel)) of the liquid crystal panel, each pixel including the R sub-pixel, the G sub-pixel and the B sub-pixel. Also, two pixels adjacent to each other in lateral direction are divided into one group, and there are three groups in total (as shown by a dashed line). Here, assuming that the B sub-pixel is the first color sub-pixel, and that the G sub-pixel is the second color sub-pixel.

As shown in FIG. 4, the sum of 1 and 1 is an even number, and the sum of 1 and 2 is an odd number, thus the actual greyscale value of the first color sub-pixel of the pixel in row 1, column 1 among two pixels in the first group is the larger one ($g_{BH1}$) of two actual greyscale values $g_{BH1}$ and $g_{BL1}$ for driving the first color sub-pixel in the first group, and the actual greyscale value of the first color sub-pixel of the pixel in row 1, column 2 among two pixels in the first group is the smaller one ($g_{BL1}$) of two actual greyscale values $g_{BH1}$ and $g_{BL1}$ for driving the first color sub-pixel in the first group.

Also, the actual greyscale value of the second color sub-pixel of the pixel in row 1, column 1 among two pixels in the first group is the smaller one ($g_{GL1}$) of two actual greyscale values $g_{GH1}$ and $g_{GL1}$ for driving the second color sub-pixel in the first group, and the actual greyscale value of the second color sub-pixel of the pixel in row 1, column 2 among two pixels in the first group is the larger one ($g_{GH1}$) of two actual greyscale values $g_{GH1}$ and $g_{GL1}$ for driving the second color sub-pixel in the first group.

The sum of 2 and 1 is an odd number, and the sum of 2 and 2 is an even number, thus the actual greyscale value of the first color sub-pixel of the pixel in row 2, column 1 among two pixels in the second group is the smaller one ($g_{BL2}$) of two actual greyscale values $g_{BH2}$ and $g_{BL2}$ for driving the first color sub-pixel in the second group, and the actual greyscale value of the first color sub-pixel of the pixel in row 2, column 2 among two pixels in the second group is the larger one ($g_{BH2}$) of two actual greyscale values $g_{BH2}$ and $g_{BL2}$ for driving the first color sub-pixel in the second group.

Also, the actual greyscale value of the second color sub-pixel of the pixel in row 2, column 1 among two pixels in the second group is the larger one ($g_{GH2}$) of two actual greyscale values $g_{GH2}$ and $g_{GL2}$ for driving the second color sub-pixel in the second group, and the actual greyscale value of the second color sub-pixel of the pixel in row 2, column 2 among two pixels in the second group is the smaller one ($g_{GL2}$) of two actual greyscale values $g_{GH2}$ and $g_{GL2}$ for driving the second color sub-pixel in the second group.

The sum of 3 and 1 is an even number, and the sum of 3 and 2 is an odd number, so the actual greyscale value of the first color sub-pixel of the pixel in row 3, column 1 among two pixels in the third group is the larger one ($g_{BH3}$) of two actual greyscale values $g_{BH3}$ and $g_{BL3}$ for driving the first color sub-pixel in the third group, and the actual greyscale value of the first color sub-pixel of the pixel in row 3, column 2 among two pixels in the third group is the smaller one ($g_{BL3}$) of two actual greyscale values $g_{BH3}$ and $g_{BL3}$ for driving the first color sub-pixel in the third group.

Also, the actual greyscale value of the second color sub-pixel of the pixel in row 3, column 1 among two pixels in the third group is the smaller one ($g_{GL3}$) of two actual greyscale values $g_{GH3}$ and $g_{GL3}$ for driving the second color sub-pixel in the third group, and the actual greyscale value of the second color sub-pixel of the pixel in row 3, column 2 among two pixels in the third group is the larger one ($g_{GH3}$) of two actual greyscale values $g_{GH3}$ and $g_{GL3}$ for driving the second color sub-pixel in the third group.

It can be known from FIG. 4 that, the actual greyscale values determined with respect to the first color sub-pixel and the second color sub-pixel of each pixel determined through the above-mentioned preferred embodiment can improve an effect on resolution of the liquid crystal panel when simulating 2D1G.

Figure 5:
FIG. 5 is a block diagram illustrating a driving device of a liquid crystal panel according to an exemplary embodiment of the present disclosure.

FIG. 5 is a block diagram illustrating the driving device of the liquid crystal panel according to an exemplary embodiment of the present disclosure.

As shown in FIG. 5, the driving device 100 of the liquid crystal panel according to the exemplary embodiment of the present disclosure may include: a grouping unit 101, an original greyscale value determination unit 102, an actual greyscale value acquisition unit 103 and a driving determination unit.

The grouping unit 101 is configured to divide the pixels in the liquid crystal panel into groups, wherein each group includes two pixels. Here, two pixels in any group are two adjacent pixels in predetermined direction. The predetermined direction can be a lateral direction or a longitudinal direction.

Here, each pixel of the liquid crystal panel includes a plurality of sub-pixels of different colors. For example, the pixel may include a red (R) sub-pixel, a green (G) sub-pixel and a blue (B) sub-pixel. In addition, the pixel may further include a yellow (Y) sub-pixel and a white (W) sub-pixel. It can be understood that the present disclosure is not limited thereto, and it may also disclose the liquid crystal panel in which each pixel includes sub-pixels of other colors.

Specifically, the grouping unit 101 may non-repeatedly divide each row of pixels of the liquid crystal panel into groups, each group including two adjacent pixels. For example, when there are only four pixels in each row of the liquid crystal panel, two adjacent pixels having column numbers 1 and 2 in each row may be divided into one group, and two adjacent pixels having column numbers 3 and 4 in each row can be divided into one group.

In addition, the grouping unit 101 may further non-repeatedly divide each column of pixels of the liquid crystal panel into groups, each group including two adjacent pixels. For example, when there are only four pixels in each column of the liquid crystal panel, two adjacent pixels having row numbers 1 and 2 in each column may be divided into one group, and two adjacent pixels having row numbers 3 and 4 in each column may be divided into one group.

The original greyscale value determination unit 102 is configured to determine the original greyscale value of the first color sub-pixel and the greyscale value of the second color sub-pixel of each pixel in each group; that is, the original greyscale value of the first color sub-pixel and the greyscale value of the second color sub-pixel of each pixel are determined separately, with respect to each pixel in each group.

Here, the first color sub-pixel and the second color sub-pixel are two sub-pixels of different colors. The colors of the first color sub-pixel and the second color sub-pixel may be determined correspondingly according to the type of the liquid crystal panel. For example, when each pixel of the liquid crystal panel includes the R sub-pixel, the G sub-pixel and the B sub-pixel, the first color sub-pixel may be any one of the R, G, B sub-pixels, and the second color sub-pixel may be any one of the R, G, B color sub-pixels of which the color is different from that of the first color sub-pixel. Preferably, the first color sub-pixel is the blue sub-pixel, the second color sub-pixel is the green sub-pixel or the red sub-pixel, or, the first color sub-pixel is the green sub-pixel or the red sub-pixel, and the second color sub-pixel is the blue sub-pixel.

In addition, the original greyscale value is the initial greyscale of the image displayed by the sub-pixel (for example, the greyscale value configured to the sub-pixel when driving the liquid crystal panel to display the image in the related art). It can be understood that, the original greyscale value determination unit 102 may determine the original greyscale value of the first color sub-pixel and the greyscale value of the second color sub-pixel of each pixel in each group through various existing methods.

The actual greyscale value acquisition unit 103 is configured to acquire two actual greyscale values for driving the first color sub-pixel in each group according to at least one of the original greyscale values of the first color sub-pixel of two pixels in each group determined by the original greyscale value determination unit 102; and to acquire two actual greyscale values for driving the second color sub-pixel in each group according to at least one of the original greyscale values of the second color sub-pixels in each group determined by the original greyscale value determination unit 102.

In other words, with respect to the first color sub-pixel of two pixels in each group (that is, with respect to two first color sub-pixels in each group), two actual greyscale values for driving the sub-pixels are acquired by using at least one of two original greyscale values of the sub-pixels; and with respect to the second color sub-pixel of two pixels in each group (that is, with respect to two second color sub-pixels in each group), two actual greyscale values for driving the sub-pixels are acquired by using at least one of two original greyscale values of the sub-pixels.

Here, the actual greyscale value is the actual greyscale of the image displayed by the sub-pixel. It can be understood that, the actual greyscale value acquisition unit 103 may be configured to acquire two actual greyscale values for driving the first color sub-pixel and two actual greyscale values for driving the second color sub-pixel in each group by using various existing methods.

As an example, the actual greyscale value acquisition unit 103 may be configured to sequentially acquire two actual greyscale values for driving the first color sub-pixel and two actual greyscale values for driving the second color sub-pixel in each group.

Specifically, the actual greyscale value acquisition unit 103 may be configured to acquire two actual greyscale values for driving the first color sub-pixel in the group according to at least one of the original greyscale values of any color sub-pixel of two pixels in any group. Then, the unit 103 may be configured to sequentially acquire two actual greyscale values for driving the first color sub-pixel and two actual greyscale values for driving the second color sub-pixel with respect to each group.

Here, the actual greyscale value acquisition unit 103 may include: an index value determination unit and a table look-up unit.

The index value determination unit is configured to determine an index value according to at least one of the original greyscale values of any color sub-pixel of two pixels in any group. Here, the index value is the greyscale value for looking up the display look-up table as mentioned below. It can be understood that, the index value determination unit may be configured to determine one index value by using various existing methods.

As an example, the index value determination unit may be configured to take the original greyscale value of the color sub-pixel of any one of two pixels in the group as the index value.

As another example, the index value determination unit may be configured to take an average value of the original greyscale values of the color sub-pixel of two pixels in the group as the index value.

The table look-up unit may be configured to look up two actual greyscale values corresponding to the index value determined by the index value determination unit from the display look-up table of the color sub-pixel, to acquire two actual greyscale values for driving the color sub-pixel in the group. In the display look-up table, each index value corresponds to two actual greyscale values.

Here, the display look-up table may be a table pre-stored at a predetermined position of the driving device of the liquid crystal panel, or be a table created by a specific unit. When using the specific unit to create the display look-up table, the actual greyscale value acquisition unit 103 may further include: a table creation unit configured to create the display look-up table of the color sub-pixel. It can be understood that, the table creation unit may be configured to create the display look-up table for any color sub-pixel.

Here, the table creation unit may include: an actual brightness value acquisition unit, a theoretical brightness value calculation unit, a relationship determination unit and a creation unit.

The actual brightness value acquisition unit is configured to acquire the actual brightness value of the color sub-pixel under the respective greyscale value within the greyscale value range of the liquid crystal panel separately in the case of front viewing and in the case of obliquely viewing. Here, viewing at the front refers to viewing the liquid crystal panel in parallel with the direction perpendicular to the liquid crystal panel. Viewing from the side refers to viewing the liquid crystal panel from the side so that the angle between the viewer and the direction perpendicular to the liquid crystal panel is about 60 degree. The value range of the greyscale value may vary along with the liquid crystal panel. When the liquid crystal panel is a 8-bit liquid crystal panel (that is, using the 8-bit binary number to indicate the greyscale value), said value range is [0, 255]; when the liquid crystal panel is the 10-bit liquid crystal panel (that is, using the 10-bit binary to indicate the greyscale value), said value range is [0, 1023]. It can be understood that, the actual brightness value acquisition unit can be used to determine the actual brightness value through various existing methods.

As an example, the actual brightness value of the color sub-pixel under the respective greyscale value within the greyscale value range in the case of front viewing and in the case of obliquely viewing may be acquired by the actual brightness value acquisition unit by measuring a gamma curve of the color sub-pixel separately in the case of front viewing and in the case of obliquely viewing. The gamma curve is a curve indicating a relationship between a greyscale and a brightness of the color sub-pixel. Here, the gamma curve can be measured by the actual brightness value acquisition unit through various existing methods.

The theoretical brightness value calculation unit is configured to calculate the theoretical brightness value of the color sub-pixel under the respective greyscale value in the value range separately in the case of front viewing and in the case of obliquely viewing. Here, the theoretical brightness value calculation unit may calculate the theoretical brightness value through various existing calculation methods.

As an example, the theoretical brightness value calculation unit may calculate, through the above equation (1), the theoretical brightness value of the color sub-pixel under any greyscale value g within the value range in the case of viewing from any angle, to calculate the theoretical brightness value of the color sub-pixel under the respective greyscale value within the value range in the case of front viewing, and to calculate the theoretical brightness value of the color sub-pixel under the respective greyscale value within the value range in the case of obliquely viewing.

The relationship determination unit is configured to determine two actual greyscale values meeting the predetermined condition and corresponding to each greyscale value within the value range, which is taken as the index value, according to the respective actual brightness value acquired by the actual brightness value acquisition unit and the respective theoretical brightness value calculated by the theoretical brightness value calculation unit, that is, with respect to each greyscale value within the value range, which is taken as the index value, two actual greyscale values corresponding to the greyscale value may be determined, and the predetermine condition can be met between each greyscale value and the two actual greyscale values. Those skilled in the art may set the predetermined condition according to experience.

Preferably, any greyscale value g within the value range, which is taken as the index value and is determined by the relationship determination unit, and the corresponding two actual greyscale values $g_H$ and $g_L$ may meet the above equation (2).

Thus, two actual greyscale values corresponding to each index value within the value range and meeting the equation (2) may be determined.

The creation unit is configured to acquire the display look-up table based on the correspondence relationship between each index value and the actual greyscale value within the value range, which may be determined by the relationship determination unit.

The driving determination unit 104 is configured to determine the actual greyscale value for driving the first color sub-pixel of each pixel among two actual greyscale values for driving the first color sub-pixel in each group acquired by the actual greyscale value acquisition unit 103, and to determine the actual greyscale value for driving the second color sub-pixel of each pixel among two actual greyscale values for driving the second color sub-pixel in each group acquired by the actual greyscale value acquisition unit 103, according to the position of each pixel in each group.

Specifically, with respect to any group, according to the position of each pixel in each group, two actual greyscale values for driving the first color sub-pixel in the group acquired by the actual greyscale value acquisition unit 103 are taken separately as the actual greyscale value of the first color sub-pixel of two pixels in the group, to drive the first color sub-pixel of two pixels, and two actual greyscale values for driving the second color sub-pixel in the group acquired by the actual greyscale value acquisition unit 103 are taken separately as the actual greyscale value of the second color sub-pixel of two pixels in the group, to drive the second color sub-pixel of two pixels.

In addition, after determining the actual greyscale value for driving the first color sub-pixel of each pixel in each group, the driving determination unit 104 uses the actual greyscale value for driving the first color sub-pixel of each pixel in each group, to drive the first color sub-pixel of each pixel of each group; and after determining the actual greyscale value for driving the second color sub-pixel of each pixel in each group, the driving determination unit 104 uses the actual greyscale value for driving the second color sub-pixel of each pixel in each group, to drive the second color sub-pixel of each pixel of each group.

Here, the actual greyscale value acquisition unit 103 may taken any one of two actual greyscale values for driving the first color sub-pixel of the group as the actual greyscale value of the first color sub-pixel of any pixel of the group; may taken any one of two actual greyscale values for driving the second color sub-pixel of the group as the actual greyscale value of the second color sub-pixel of any pixel of the group.

As a preferred embodiment, the driving determination unit 104 may determine a larger one of two actual greyscale values for driving the first color sub-pixel in each group as the actual greyscale value for driving the first color sub-pixel of one pixel of two pixels, of which a sum of a row number and a column number is an even number, in each group; determine a smaller one of two actual greyscale values for driving the first color sub-pixel in each group as the actual greyscale value for driving the first color sub-pixel of one pixel of two pixels, of which a sum of a row number and a column number is an odd number, in each group; determine a larger one of two actual greyscale values for driving the second color sub-pixel in each group as the actual greyscale value for driving the second color sub-pixel of one pixel of two pixels, of which a sum of a row number and a column number is an odd number, in each group; and determine a smaller one of two actual greyscale values for driving the second color sub-pixel in each group as the actual greyscale value for driving the second color sub-pixel of one pixel of two pixels, of which a sum of a row number and a column number is an even number, in each group.

The driving method and driving device of the liquid crystal panel according to the exemplary embodiment of the present disclosure, can improve the color bias of the liquid crystal panel without affecting the aperture ratio and the transmission rate of the liquid crystal panel.

In addition, the above method according to the present disclosure may be embodied as a computer code in a computer readable recording medium. Those skilled in the art may implement the computer code according to the description of the above method. When the computer code is executed in a computer, the above method of the present disclosure is implemented.

In addition, each unit in the driving device of the liquid crystal panel according to the exemplary embodiment of the present disclosure may be implemented as a hardware component. Those skilled in the art may implement, according to a process executed by a respective defined unit, the respective unit by using, for example, a Field-Programmable Gate Array (FPGA) or an Application-Specific Integrated Circuit (ASIC).

The above embodiments of the present disclosure are only exemplary, and the present disclosure is not limited thereto. It should be understood by those skilled in the art that the exemplary embodiments can be changed without deviating from the principle and the spirit of the present disclosure, wherein the scope of the present disclosure is defined in the appended claims and the equivalents thereof.

The invention claimed is:

1. A driving method of a liquid crystal panel, comprising:
   (A) dividing pixels in a liquid crystal panel into groups, wherein each group comprises two pixels, and two pixels in any group are two adjacent pixels in a predetermined direction;
   (B) determining an original greyscale value of a first color sub-pixel and an original greyscale value of a second color sub-pixel of each pixel in each group;
   (C) acquiring two actual greyscale values for driving the first color sub-pixel in each group according to at least one of the original greyscale values of the first color sub-pixel of two pixels in each group and acquiring two actual greyscale values for driving the second color sub-pixel in each group according to at least one of the original greyscale values of the second color sub-pixel of two pixels in each group by determining an index value according to at least one of the original greyscale values of the color sub-pixel of the two pixels in the group and looking up two actual greyscale values corresponding to the index value from a display look-up table of the color sub-pixel, wherein the table is acquired by acquiring an actual brightness value of the color sub-pixel under a respective greyscale value within a greyscale value range of the liquid crystal panel separately in a case of front viewing and in a case of oblique viewing,
   calculating a theoretical brightness value of the color sub-pixel under the respective greyscale value within the greyscale value range separately in the case of front viewing and in the case of oblique viewing using $Lv(g)=Lv(g_{max})'\times(g/g_{max})^\gamma$, wherein $\gamma$ is a predetermined gamma value, $Lv(g)$ is the theoretical brightness value of the color sub-pixel under the greyscale value g in the case of viewing from an angle, and $Lv(g_{max})'$ is the actual brightness values of the color sub-pixel under the maximum greyscale value $g_{max}$ within the greyscale value range in the case of viewing from the angle, and wherein viewing from the angle defines one of front viewing or oblique viewing, and
   determining two actual greyscale values meeting a predetermined condition and corresponding to each greyscale value within the greyscale value range which is taken as the index value, according to the acquired respective actual brightness value and the calculated respective theoretical brightness value, wherein any greyscale value g within the greyscale value range, which is taken as the index value, as well as two corresponding actual greyscale values $g_H$ and $g_L$ meet the following predetermined condition:

$$\min \quad y=[Lv_{front}(g)+Lv_{front}(g)-Lv_{front}(g_H)'-Lv_{front}(g_L)']^2+[Lv_{oblique}(g)+Lv_{oblique}(g)-Lv_{oblique}(g_H)'-Lv_{oblique}(g_L)']^2,$$

wherein $Lv_{front}(g)$ and $Lv_{oblique}(g)$ are the theoretical brightness value of the color sub-pixel under the greyscale value g separately in the case of front viewing and in the case of oblique viewing, $Lv_{front}(g_H)'$ and $Lv_{oblique}(g_H)'$ are the actual brightness value of the color sub-pixel under the actual greyscale value $g_H$ separately in the case of front viewing and in the case of oblique viewing, $Lv_{front}(g_L)'$ and $Lv_{oblique}(g_L)'$ are the actual brightness value of the color sub-pixel under the actual greyscale value is $g_L$ separately in the case of front viewing and in the case of obliquely viewing, and associating each index value with the determined two actual greyscale values; and
   (D) determining the actual greyscale value for driving the first color sub-pixel of each pixel, among the two actual greyscale values for driving the first color sub-pixel in each group, and determining the actual greyscale value for driving the second color sub-pixel of each pixel, among the two actual greyscale values for driving the second color sub-pixel in each group, according to a position of each pixel in each group.

2. The driving method of claim 1, wherein step (D) comprises:
   determining a larger one of the two actual greyscale values for driving the first color sub-pixel in each group as the actual greyscale value for driving the first color sub-pixel of one pixel of the two pixels, of which a sum of a row number and a column number is an even number, in each group;
   determining a smaller one of the two actual greyscale values for driving the first color sub-pixel in each group as the actual greyscale value for driving the first color sub-pixel of one pixel of the two pixels, of which a sum of a row number and a column number is an odd number, in each group;

determining a larger one of the two actual greyscale values for driving the second color sub-pixel in each group as the actual greyscale value for driving the second color sub-pixel of one pixel of the two pixels, of which a sum of a row number and a column number is an odd number, in each group; and determining a smaller one of the two actual greyscale values for driving the second color sub-pixel in each group as the actual greyscale value for driving the second color sub-pixel of one pixel of the two pixels, of which a sum of a row number and a column number is an even number, in each group.

3. The driving method of claim 1, wherein the predetermined direction is a lateral direction or a longitudinal direction.

4. The driving method of claim 1, wherein the step of determining the index value comprises:

taking the original greyscale value of the color sub-pixel of any one of the two pixels in the group as the index value.

5. The driving method of claim 1, wherein the step of determining the index value comprises:

taking an average value of the original greyscale values of the color sub-pixel of the two pixels in the group as the index value.

6. The driving method of claim 1, wherein the actual brightness value of the color sub-pixel under the respective greyscale value within the greyscale value range of the liquid crystal panel in the case of front viewing and in the case of obliquely viewing is acquired by measuring a gamma curve of the color sub-pixel separately in the case of front viewing and in the case of obliquely viewing.

7. A driving device of a liquid crystal panel, comprising:

a grouping unit configured to divide pixels in a liquid crystal panel into groups, wherein each group comprises two pixels, and two pixels in any group are two adjacent pixels in a predetermined direction;

an original greyscale value determination unit configured to determine an original greyscale value of a first color sub-pixel and an original greyscale value of a second color sub-pixel of each pixel in each group;

an actual greyscale value acquisition unit configured to sequentially acquire two actual greyscale values for driving the first color sub-pixel in each group according to at least one of the original greyscale values of the first color sub-pixel of two pixels in each group and acquire two actual greyscale values for driving the second color sub-pixel in each group according to at least one of the original greyscale values of the second color sub-pixel of two pixels in each group, wherein the actual greyscale value acquisition unit comprises:

an index value determination unit configured to determine an index value according to at least one of the original greyscale values of any color sub-pixel of the two pixels in any group, a table creation unit configured to create a display look-up table of the color sub-pixel and comprising:

an actual brightness value acquisition unit configured to acquire an actual brightness value of the color sub-pixel under a respective greyscale value within a greyscale value range of the liquid crystal panel separately in a case of front viewing and in a case of oblique viewing, a theoretical brightness value calculation unit configured to calculate a theoretical brightness value of the color sub-pixel under the respective greyscale value within the greyscale value range separately in the case of front viewing and in the case of oblique viewing based on $Lv(g)=Lv(g_{max})'\times(g/g_{max})^\gamma$, wherein $\gamma$ is a predetermined gamma value, $Lv(g)$ is the theoretical brightness value of the color sub-pixel under the greyscale value g in the case of viewing from an angle, and $Lv(g_{max})'$ is the actual brightness values of the color sub-pixel under the maximum greyscale value $g_{max}$ within the greyscale value range in the case of viewing from the angle, and wherein viewing from the angle defines one of front viewing or oblique viewing, a relationship determination unit configured to determine two actual greyscale values meeting a predetermined condition and corresponding to each greyscale value within the greyscale value range which is taken as the index value, according to the acquired respective actual brightness value and the calculated respective theoretical brightness value, such that $$\min\ y=[Lv_{front}(g)+Lv_{front}(g)-Lv_{front}(g_H)'-Lv_{front}(g_L)']^2+[Lv_{oblique}(g)+Lv_{oblique}(g)-Lv_{oblique}(g_H)'-Lv_{oblique}(g_L)']^2,$$

wherein $Lv_{front}(g)$ and $Lv_{oblique}(g)$ are the theoretical brightness value of the color sub-pixel under the greyscale value g separately in the case of front viewing and in the case of oblique viewing, $Lv_{front}(g_H)'$ and $Lv_{oblique}(g_H)'$ are the actual brightness value of the color sub-pixel under the actual greyscale value $g_H$ separately in the case of front viewing and in the case of oblique viewing, $Lv_{front}(g_L)'$ and $Lv_{oblique}(g_L)'$ are the actual brightness value of the color sub-pixel under the actual greyscale value is $g_L$ separately in the case of front viewing and in the case of oblique viewing, and a creation unit configured to associate each index value with the determined actual greyscale values to define the display look-up table, and a table look-up unit configured to look up two actual greyscale values corresponding to the index value from the display look-up table of the color sub-pixel, to acquire the two actual greyscale values for driving the color sub-pixel in the group; and a driving determination unit configured to determine the actual greyscale value for driving the first color sub-pixel of each pixel, among the two actual greyscale values for driving the first color sub-pixel in each group, and to determine the actual greyscale value for driving the second color sub-pixel of each pixel, among the two actual greyscale values for driving the second color sub-pixel in each group, according to a position of each pixel in each group.

8. The driving device of claim 7, wherein the driving determination unit is configured to determine a larger one of the two actual greyscale values for driving the first color sub-pixel in each group as the actual greyscale value for driving the first color sub-pixel of one pixel of the two pixels, of which a sum of a row number and a column number is an even number, in each group; and to determine a smaller one of the two actual greyscale values for driving the first color sub-pixel in each group as the actual greyscale value for driving the first color sub-pixel of one pixel of the two pixels, of which a sum of a row number and a column number is an odd number, in each group; and to determine a larger one of the two actual greyscale values for driving the second color sub-pixel in each group as the actual greyscale value for driving the second color sub-pixel of one pixel of the two pixels, of which a sum of a row number and a column number is an odd number, in each group; and to determine a smaller one of the two actual greyscale values for driving the second color sub-pixel in each group as the actual greyscale value for driving the second color sub-pixel of one pixel of the two pixels, of which a sum of a row number and a column number is an even number, in each group.

9. The driving device of claim 7, wherein the predetermined direction is a lateral direction or a longitudinal direction.

10. The driving device of claim 7, wherein the index value determination unit is configured to take the original greyscale value of the color sub-pixel of any one of the two pixels in the group as the index value.

11. The driving device of claim 7, wherein the index value determination unit is configured to take an average value of the original greyscale values of the color sub-pixel of the two pixels in the group as the index value.

12. The driving device of claim 7, wherein the actual brightness value acquisition unit is configured to acquire the actual brightness value of the color sub-pixel under the respective greyscale value within the greyscale value range of the liquid crystal panel in the case of front viewing and in the case of obliquely viewing by measuring a gamma curve of the color sub-pixel separately in the case of front viewing and in the case of obliquely viewing.

* * * * *